United States Patent
Schmitt

[15] 3,669,141
[45] June 13, 1972

[54] FAUCET MOUNTING MEANS

[72] Inventor: William C. Schmitt, Brown Deer, Wis.
[73] Assignee: Milwaukee Faucets, Inc., Milwaukee, Wis.
[22] Filed: Nov. 27, 1970
[21] Appl. No.: 93,006

[52] U.S. Cl. .................................. 137/359, 85/1 H
[51] Int. Cl. ............................................. F16l 5/00
[58] Field of Search .................. 285/208, 209, 159, 210;
85/1 H, 3; 4/191, 192; 137/359

[56] References Cited

UNITED STATES PATENTS

| 832,287 | 10/1906 | Beach | 285/210 |
|---|---|---|---|
| 2,987,330 | 6/1961 | Curran | 285/159 |
| 3,193,662 | 7/1965 | Brandt | 285/208 X |
| 3,414,298 | 12/1968 | Butler | 285/209 |

Primary Examiner—Henry T. Klinksiek
Attorney—James E. Nilles

[57] ABSTRACT

Means for mounting a faucet on a counter top, vertical wall or other surface, and without the necessity of having any access space on the other side of the surface. The means includes a threaded back-up plate which can be inserted in an opening in the counter top or other surface for positioning on the other side of the surface, and which can be securely attached to a mounting plate located on top of the counter or other surface.

A method of mounting a faucet on and from one side of a surface.

1 Claim, 6 Drawing Figures

PATENTED JUN 13 1972 3,669,141
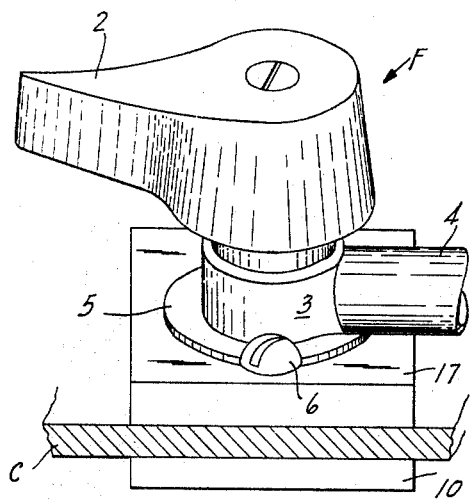
Fig. 1
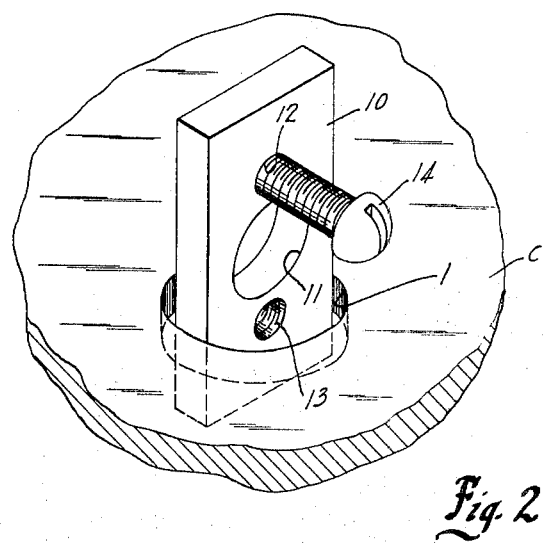
Fig. 2
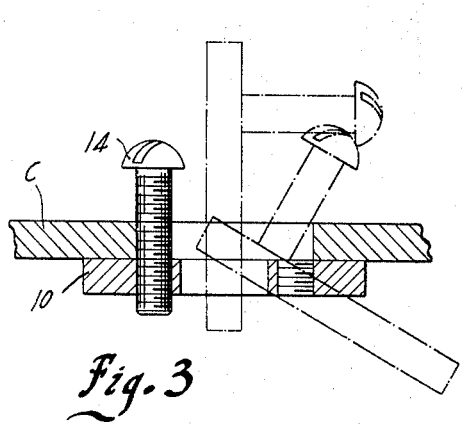
Fig. 3
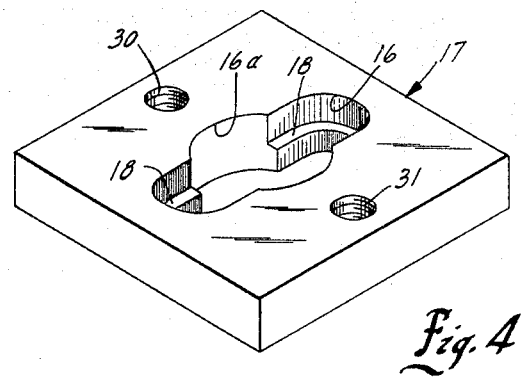
Fig. 4
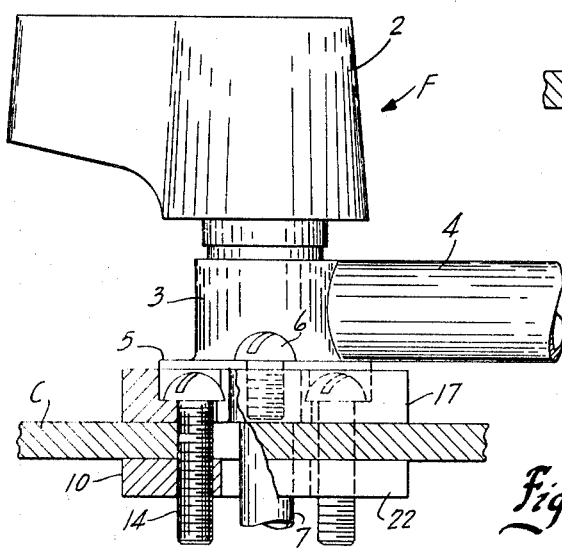
Fig. 6
Fig. 5
INVENTOR:
WILLIAM C. SCHMITT
BY: James E. Nilles
ATTORNEY

FAUCET MOUNTING MEANS

BACKGROUND OF THE INVENTION

The invention pertains generally to water faucets or the like which are mounted on a surface, such as for example, a counter top so that the water is delivered through a conduit running through the counter and to the valve body of the faucet. More particularly, the invention pertains to means for mounting such a faucet on a surface, such mounting being accomplished from the accessible side of the counter and without the necessity of the mechanic having to work on the opposite and often unaccessible side of the surface in order to mount the faucet.

SUMMARY OF THE INVENTION

The present invention provides a mounting means for a water faucet or the like and by which means the faucet can be mounted on a counter top or other surface without the necessity of having access to the other side of the counter top or other surface.

More specifically, the invention provides a threaded back-up plate which can be inserted through a hole in the surface, and then positioned on the opposite side of the surface for attachment to a mounting plate that is then located on the accessible side of the counter or surface. The threaded back-up plate and the mounting plate have aligned apertures through which threaded connecting means such as bolts extend to hold them in securely clamped position on the counter top or other surface.

Furthermore, both the back-up plate and mounting plate have an aligned central aperture through which the water pipe extends for engagement with the valve body located on the top of the counter or other surface. The mounting plate is so constructed that it can be readily engaged by the bolts, one of which has been previously threaded into the back-up plate before the latter has been positioned through the hole in the surface.

These and other objects and advantages of the present invention will appear hereinafter as this disclosure progresses, reference being had to the accompanying drawings.

BRIEF DESCRIPTION OF THE DRAWINGS

FIG. 1 is a perspective view of a faucet mounted in a counter top in accordance with the present invention, the counter top being shown in section and broken away for clarity and also a portion of the faucet being shown as broken away for clarity;

FIG. 2 is a fragmentary view of a counter top and showing the threaded back-up plate being inserted downwardly through the counter top;

FIG. 3 is a vertical, cross section view through the counter top and its opening as shown in FIG. 2, and showing the threaded back-up plate in broken lines in its preliminary position prior to its being maneuvered into final position as shown in the solid lines;

FIG. 4 is a perspective view of the mounting plate shown in FIG. 1;

FIG. 5 is a view showing the back-up plate and the mounting plate secured in clamping relationship with the counter top therebetween; and FIG. 6 is an elevational view of a faucet mounted by means of the present invention on a counter top, the view showing certain parts in section or as being broken away for clarity.

DESCRIPTION OF A PREFERRED EMBODIMENT

The invention will be shown and described as being mounted on a counter top, but it is also applicable to being mounted on other surfaces, such as a vertical wall or the like.

It has heretofore been a difficult task to mount a water faucet on a counter top, particularly where access beneath the counter top was difficult, if not impossible. The present invention permits mounting and installation of a faucet F on a counter top C and the counter top having an opening 1 extending therethrough. The faucet includes the conventional handle 2, a valve body 3, and a discharge outlet 4. It should be understood that the present mounting means is applicable either to a single or a double faucet and for purposes of illustrating the invention, only one faucet is shown. The faucet F also includes a lower flange 5 having aperture means for the reception of bolts 6 for purposes that will appear.

A water inlet tube 7 extends upwardly through the opening 1 in the counter top and into the valve body in the known manner so that water is admitted to the valve body and when the handle is turned to an open position, water can flow out the conduit 4. In accordance with the present invention, a threaded back-up plate 10 which is generally rectangular in shape, has a central aperture 11 extending therethrough and also has a pair of threaded apertures 12 and 13, one located on either side of the central aperture 11. It will be noted that the threaded back-up plate is of a width which is smaller than the opening 1 in the counter top so that, as shown in FIG. 2, the back-up plate can be slipped downwardly through the opening. However, prior to the back-up plate being passed downwardly through the opening, a bolt 14 is threaded at least partially into one of the threaded apertures 12 so that the mechanic can hold the back-up plate by the threaded bolt 14.

As shown in FIG. 3, the threaded back-up plate is turned to a generally horizontal position as it is substantially passed through the opening and is then maneuvered through the full line position shown in FIG. 3. This can all be accomplished by the mechanic simply holding onto the upper end of the bolt 14. When the plate 10 is thus in place, the mechanic can then slip the elongated slot 16 of the mounting plate 17 over the bolt 14 and cause the head of the bolt to rest on the flange or shoulder 18 which is located around the two end portions of the elongated opening 16. The elongated opening 16 includes an enlarged central port 16a which when in the assembled relationship, is in vertical alignment with aperture 11 of the back-up plate and the aperture 1 in the center top. The mechanic can then insert the other bolt 22 which also rests on the upwardly facing flange 18 of the mounting plate. The operator then tightens the bolts 14 and 22 thereby causing the back-up plate and mounting plate to clampingly engage the counter top on opposite sides thereof.

After the back-up and mounting plates have thus been secured to the counter top, the faucet assembly can be secured to the top of the mounting plate by bolts 6 which extend through the flange 5 of the faucet and are threadably engaged in the threaded apertures 30 and 31 of the mounting plate.

With the present invention, it is therefore possible to mount the faucet on a counter top without the necessity of having access to the underside of the counter.

I claim:

1. Mounting means for securing a faucet to a surface having an opening therethrough, said means comprising, a back-up plate having a central aperture and also having a threaded aperture on either side of said central aperture, one of the dimensions of said back-up plate being smaller than that of the opening in said surface so as to permit said back-up plate to pass through said surface opening, a mounting plate having a centrally located and elongated slot therein, said elongated slot including a central enlarged opening and a smaller opening merging with said central opening and at each of opposite sides thereof, bolt means for extending through each of said smaller openings and threadably engaging said threaded apertures in said back-up plate, said elongated slot also having an outwardly facing shoulder at either end thereof and in said smaller openings, said bolt means abutting against said shoulder of each of said smaller openings when said mounting means is fully assembled, said mounting plate slot being of such size and shape that it can pass over one of said bolt means as the latter extends outwardly through the opening in said surface, and means for securing said faucet to said mounting plate.

* * * * *